US006938537B2

(12) United States Patent
Scharp

(10) Patent No.: US 6,938,537 B2
(45) Date of Patent: Sep. 6, 2005

(54) PISTON FOR AN INTERNAL COMBUSTION ENGINE

(75) Inventor: Rainer Scharp, Vaihingen (DE)

(73) Assignee: MAHLE GmbH, Stuttgart (DE)

( * ) Notice: Subject to any disclaimer, the term of this patent is extended or adjusted under 35 U.S.C. 154(b) by 66 days.

(21) Appl. No.: 10/749,176

(22) Filed: Dec. 30, 2003

(65) Prior Publication Data

US 2004/0244581 A1 Dec. 9, 2004

(30) Foreign Application Priority Data

Jun. 7, 2003 (DE) ........................................ 103 25 914

(51) Int. Cl.[7] .............................. F01B 31/08; F16J 1/04

(52) U.S. Cl. .............................. 92/186; 92/218; 92/256

(58) Field of Search .......................... 92/186, 213, 216, 92/217, 218, 219, 256

(56) References Cited

U.S. PATENT DOCUMENTS 4,286,505 A * 9/1981 Amdall ........................ 92/186
5,081,968 A * 1/1992 Bruni .......................... 92/186
5,261,363 A * 11/1993 Kemnitz ...................... 92/186
6,003,479 A * 12/1999 Evans ........................ 92/186
6,026,777 A * 2/2000 Kemnitz et al. ......... 123/193.6
6,286,414 B1 * 9/2001 Kruse .......................... 92/186

FOREIGN PATENT DOCUMENTS

DE 198 46 152 A 10/1998

* cited by examiner

*Primary Examiner*—Edward K. Look
*Assistant Examiner*—Michael Leslie
(74) *Attorney, Agent, or Firm*—Collard & Roe, P.C.

(57) ABSTRACT

A piston for an internal combustion engine which comprises a piston body, and a ring element, which together form a basic piston body. When the ring element is screwed onto the piston body, it forms a ring shaped cooling channel which is closed off in a direction of the pin bosses by a projection of the basic body. The projection is structured in the form of an elastically resilient cup spring which is deformed when the ring element is screwed onto the body. This deformation and counter stress, contributes to the strength of the screw connection.

3 Claims, 2 Drawing Sheets

PISTON FOR AN INTERNAL COMBUSTION ENGINE

CROSS REFERENCE TO RELATED APPLICATIONS

Applicant claims priority under 35 U.S.C. §119 of German Application Ser. No. 103 25 914.7 filed on Jun. 7, 2003.

BACKGROUND

The invention relates to a piston for an internal combustion engine, with a piston body having two pin bosses.

A piston for an internal combustion engine is known from Reference DE 198 46 152 A1, which consists of a basic piston body having pin bosses and having a box-shaped piston skirt. A ring-shaped component is welded onto the head region of the basic piston body, with part of the ring belt area being worked into the outside of this component, and the upper part being formed as a top Land of the piston. The component, together with the piston crown sided part of the basic piston body, forms a ring-shaped cooling channel that is closed, towards the boss side, by a circumferential wall molded onto the basic piston body. With this design, the ring-shaped component is welded to the basic piston body by way of each of its two faces, which makes the production of the piston known from the state of the art very time-consuming and labor-intensive.

Proceeding from this, the invention is based on the problem of simplifying, accelerating, and thereby decreasing the cost of the production process of a piston having a cooling channel.

SUMMARY OF THE INVENTION

Here, a quickly and easily produced screw connection between a basic piston body and a ring element is produced, which is given great strength by the mechanical stress that an elastically structured projection places on the ring element.

Thus, the invention relates to a piston for an internal combustion engine comprising a piston body made from forged steel. This body can include at least two pin bosses. There can be also at least one pin boss support for coupling the two pin bosses to the piston head. There can also be at least one circumferential projection that extends radially out from a longitudinal axis of the piston body.

In addition, there can be at least one ring element that is screwed onto the piston body so that the ring element and the circumferential projection form a cooling channel in the piston body. In this case, the circumferential projection forms a support ring in the form of a cup spring which can be deformed when the ring element is screwed onto the piston body.

In at least one embodiment, the ring element has a face that faces the pin bosses wherein the ring element has a recess that is directed towards a radially inside region. This region is bounded by a radially extending surface and an axially oriented surface extending normal to the radially extending surface and extending axial with a direction of the pin bosses. In this case, at least one circumferential projection has a corresponding radially extending surface and a corresponding axially extending surface which rests against the radially extending surface and the axially extending surface of the ring element after the ring element has been screwed onto the piston body.

In at least one additional embodiment, the ring element has a plurality of threads and the piston body has a corresponding plurality of threads. Thus, wherein when the ring element is screwed onto the body, the circumferential projection is deformed so that the axial face of the circumferential projection contacts the axial face of the ring element. In addition, the radial face of the circumferential projection contacts the radial face of the ring element. This can create a deformation of the circumferential projection which provides a counteracting force to contribute to a strength of a screw connection between said ring element and said body.

BRIEF DESCRIPTION OF THE DRAWINGS

Other objects and features of the present invention will become apparent from the following detailed description considered in connection with the accompanying drawings which disclose at least one embodiment of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 1:
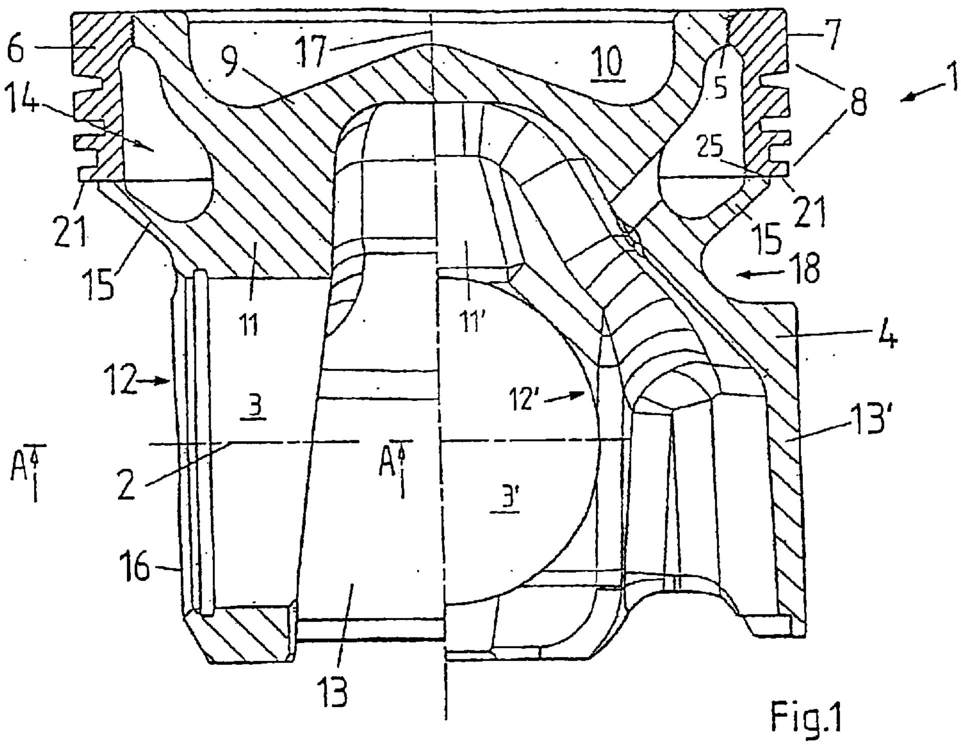
FIG. 1 is a cross-sectional diagram of a piston for an internal combustion engine, consisting of two halves, which represent two longitudinal sections of the piston, offset by 90°.

Turning now in detail to the drawings, FIG. 1 shows a piston 1 for an internal combustion engine in a cross-sectional diagram that comprises two halves, the left half showing a cross-section of piston 1 along a longitudinal axis 2 of a pin bore 3, and the right half showing a cross-section of piston 1 offset from the former by 90°. Piston 1 comprises a basic piston body 4, with a ring element 6 screwed onto it by way of a thread 5 on the piston head side, which element carries a top Land 7 and a ring belt area 8 of piston 1. The basic piston body 4 and ring element 6 are made of steel.

Basic piston body 4 is structured in one piece and has a combustion bowl 10 in the region of piston head 9. Two pin bosses 12, 12', each having a pin bore 3, 3', respectively, are formed onto piston head 9, by way of a pin boss support 11, 11', respectively. Pin bosses 12, 12' have faces 16 which are arranged radially set back relative to ring element 6, in the direction of a longitudinal piston axis 17. Pin bosses 12, 12' are connected with one another via piston skirt elements 13, 13'. Between skirt elements 13, 13' and an upper region of piston 1 that carries ring element 6, the basic piston body 4 has recesses 18 that are arranged to go partially around the circumference in the region of skirt elements 13, 13' of the basic piston body 4. A basic piston body 4 in which the faces 16 of pin bosses 12, 12' are not arranged set back relative to ring belt area 8 can also be used as a carrier of ring element 6. With this design, recess 18 is arranged to go around the circumference over the entire circumference of the piston, partly between skirt elements 13, 13' and ring element 6, and partly between pin bosses 12, 12' and ring element 6.

In the region of piston head 9, basic piston body 4, together with ring element 6, forms a ring-shaped cooling channel 14, which is worked partly into basic piston body 4 and partly into ring element 6. In the direction of pin boss 12, cooling channel 14 is covered by a projection 15 of basic piston body 4, which is structured like a cup spring and arranged or extending at an incline in the direction of piston head 9, proceeding from basic piston body 4.

Figure 2:
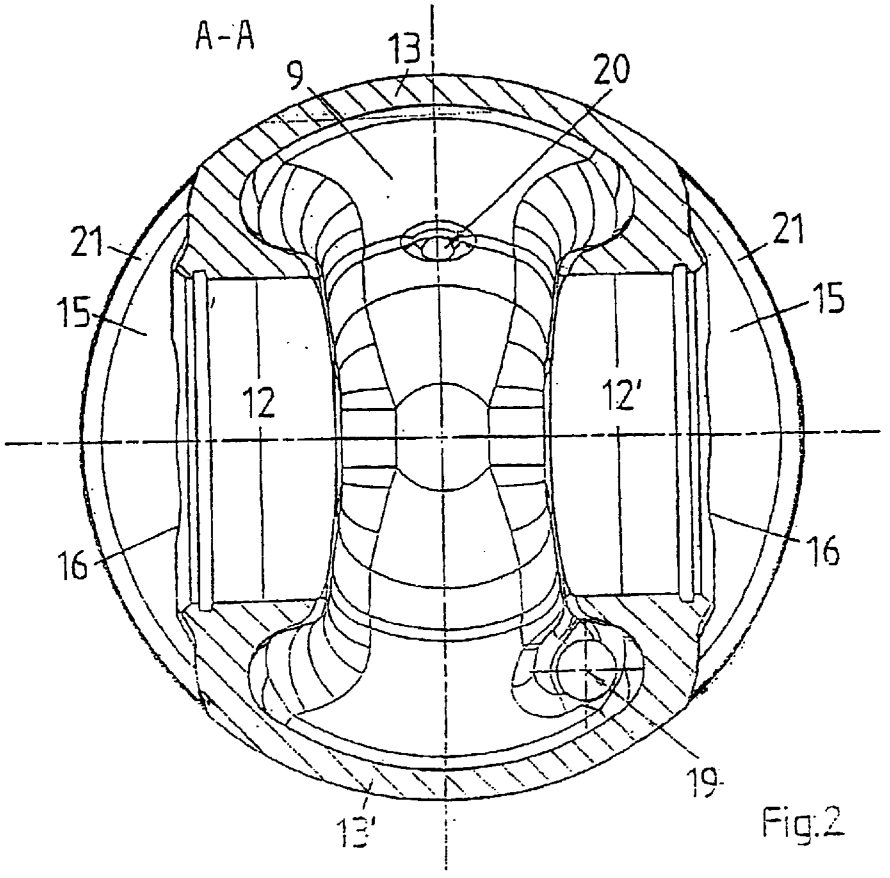
FIG. 2 is a cross-section of the piston along the line A—A in FIG. 1.

FIG. 2 represents a cross-section crosswise through piston 1 along the line A—A in FIG. 1. In this view, the side of piston head 9 that faces pin bosses 12, 12' is shown from the bottom. FIG. 2 shows an inlet opening 19 and outlet opening 20 of cooling channel 14, (See FIG. 1) for allowing the flow of cooling fluid provided for cooling of piston 1. Skirt elements 13, 13' and pin bosses 12, 12' connected with them are shown cross-hatched. In addition, projection 15, which is visible in the region of back-set faces 16 of pin bosses 12, 12', shown from the bottom, can be seen in FIG. 2, as can lower face 21 of ring element 6.

In the production of piston 1, for the purpose of an improved seal of the screw connection, thread 5 can first have a ceramic sealer, before ring element 6 is screwed onto pre-finished basic piston body 4 by way of thread 5. With this design, lower face 21 of ring element 6 comes into contact with surface.25 of projection 15, which is structured to be flat, i.e. like a plateau in the present exemplary embodiment, but which can also be structured in roof shape or in plate shape, or can have a spherical form. Projection 15 is structured to have such thin walls that when ring element 6 is screwed on, it gives way in elastic manner, for example, it bends if the element exerts pressure on projection 15. After ring element 6 has been screwed on, projection 15 therefore puts ring element 6 under mechanical stress, which contributes to improving the strength of the screw connection between ring element 6 and the head region of basic piston body 4.

Figure 3:
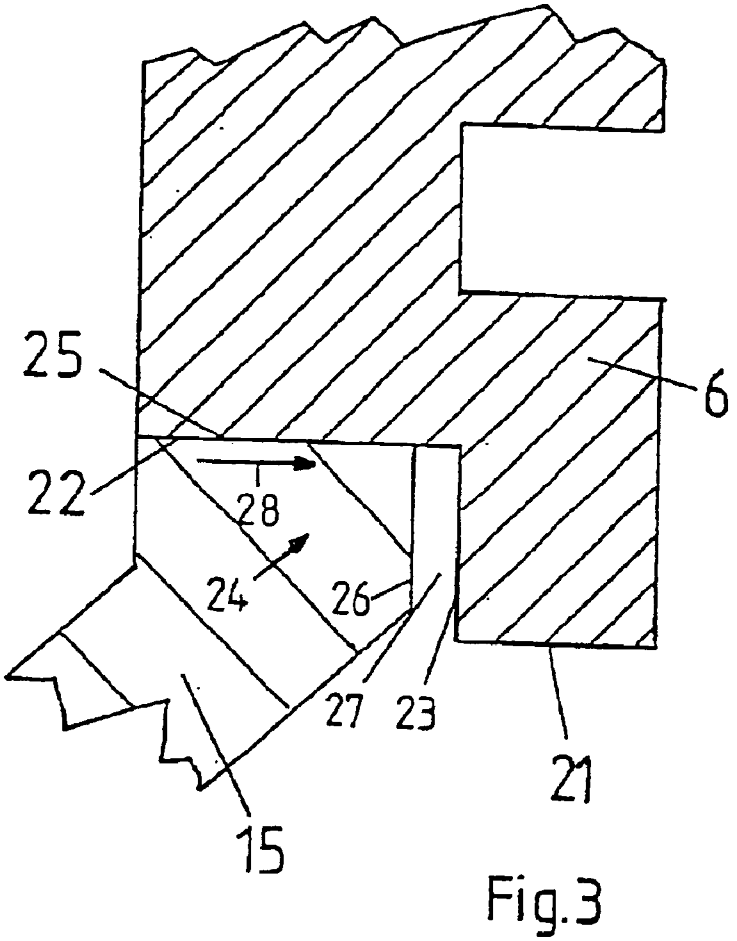
FIG. 3 is an embodiment of the lower face of a ring element screwed together with the basic piston body.

In an advantageous embodiment of the invention, according to FIG. 3, lower face 21 of ring element 6 has a recess 24 that has a radially oriented surface 22 on its inside and, following this, an axially oriented surface 23 on its outside. With this design, axially oriented surface 23 is turned into lower face 21 of ring element 6, in the radial direction, to such an extent that, as FIG. 3 shows, a radial play 27 results between an axially oriented, outer, upper delimitation surface 26 of projection 15 and axially oriented surface 23 of recess 24, when radially oriented surface 22 of lower face 21 of ring element 6 comes into first contact with surface 25 of projection 15 as ring element 6 is being screwed onto piston 1. With this design, the radial width of this radial play is between 0 $\mu$m and 300 $\mu$m.

The elastic resilience of projection 15 has the result, as ring element 6 continues to be screwed on, that the upper region of projection 15 moves in the direction of arrow 28, until the outer delimitation surface, or radially outside surface 26 of projection 15 comes to rest against axially oriented surface 23 of recess 24. This contributes to improving the strength of the screw connection and the rigidity of the upper piston region.

Accordingly, while at least one embodiment of the present invention have been shown and described, it is to be understood that many changes and modifications may be made thereunto without departing from the spirit and scope of the invention as defined in the appended claims.

Reference Symbol List

1 piston
2 longitudinal axis of the boss bores
3 pin bore
4 basic piston body
5 thread
6 ring element

7 top Land
8 ring belt area
9 piston head
10 combustion bowl
11, 11' pin boss supports
12, 12' pin bosses
13, 13' piston skirt element
14 cooling channel
15 projection
16 face
17 longitudinal piston axis
18 recess
19 inlet opening
20 outlet opening
21 lower face of the ring element 6
22 radially oriented surface of the recess 24
23 axially oriented surface of the recess 24
24 recess
25 surface of the projection 15
26 outer, upper delimitation surface of the projection 15
27 radial play
28 arrow

What is claimed is:

1. A piston for an internal combustion engine comprising:

a) a piston body comprising:

I) at least two pin bosses;

ii) at least one piston head coupled to said at least two pin bosses;

iii) at least one pin boss support for coupling said at least two pin bosses to said at least one piston head; and iv) at least one circumferential projection that extends radially our from a longitudinal axis of said body; and b) at least one ring element screwed onto said piston body so that said ring element and said at least one circumferential projection form a cooling channel in said piston body, wherein said at least one circumferential projection forms a support ring in the form of a cup spring which can be deformed when said ring element is screwed onto said body.

2. The piston as in claim 1, wherein said ring element has a face that faces said at least two pin bosses, wherein said ring element has a recess that is directed towards a radially inside region, bounded by a radially extending surface and an axially oriented surface extending normal to said radially extending surface, and axially with a direction of said pin bosses and wherein said at least one circumferential projection has a corresponding radially extending surface, and a corresponding axially extending surface, which rest against said radially extending surface and said axially extending surface respectively, of said ring element after said ring element has been screwed onto said body.

3. The piston as in claim 2, wherein said ring element has a plurality of threads and said piston body has a plurality of threads, corresponding to said threads on said ring element, wherein when said ring element is screwed onto said piston body, and said at least one circumferential projection is deformed so that said axial face of said at least one circumferential projection contacts said axial face of said ring element and said radial face of said at least one circumferential projection contacts said radial face of said ring element wherein said deformation of said at least one circumferential projection provides a counteracting force to contribute to a strength of a screw connection between said ring element and said body.

* * * * *